Figure 1:
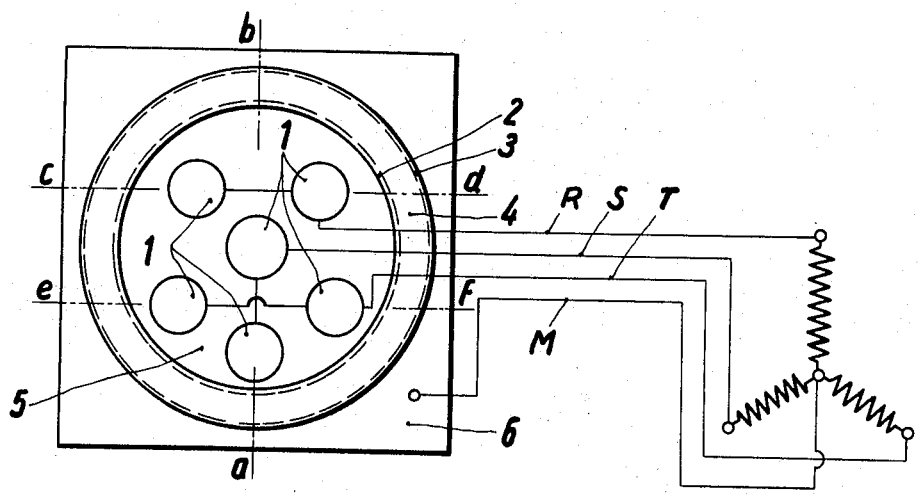

United States Patent [19]
Fischer

[11] 3,772,449
[45] Nov. 13, 1973

[54] PLANT FOR THE ELECTRIC SLAG REFINING OF METALS

[75] Inventor: Ernst Rudolf Fischer, Vienna, Austria

[73] Assignee: Gebr. Bohler & Co. AG, Vienna, Austria

[22] Filed: June 9, 1972

[21] Appl. No.: 261,512

[30] Foreign Application Priority Data
July 1, 1971   Germany.................. P 21 32 711.7

[52] U.S. Cl. ................................................ 13/12
[51] Int. Cl. ........................................... F27d 11/10
[58] Field of Search .............................. 13/12, 9 ES

[56] References Cited
UNITED STATES PATENTS
3,614,285   10/1971   Holzgruber et al. ............... 13/9 ES
3,665,081   5/1972   Paton et al. .............................. 13/12

Primary Examiner—Roy N. Envall, Jr.
Attorney—Arthur O. Klein

[57] ABSTRACT

The plant comprises an ingot mold, adapted to hold a slag layer, means for cooling said ingot mold with a liquid, a polyphase a.c. supply system having at least three phase conductors, and at least two pairs of fusible electrodes extending into said ingot mold and adapted to extend into said slag layer. The fusible electrodes are arranged so that in a top plan view the electrodes of a first pair thereof are spaced apart on a first axis and the electrodes of each additional pair thereof are spaced apart on an additional axis, which is normal to said first axis. The fusible electrodes are connected to said phase conductors in an arrangement which is symmetric with respect to the electrodes disposed on said first axis. The fusible electrodes are adapted to be fused down by heat generated as a result of an electric current flowing through said fusible electrodes so that molten metal is formed and is caused to solidify in said ingot mold to form a solid ingot when said mold is cooled with a liquid.

7 Claims, 2 Drawing Figures

PLANT FOR THE ELECTRIC SLAG REFINING OF METALS

This invention relates to a plant for the electric slag refining of metals, particularly of steels, in which a plurality of fusible electrodes extending into a slag layer and connected to a polyphase a.c. supply system having preferably three phases are fused down in a liquid-cooled ingot mold under the action of the heat generated by the electric currents flowing through the electrodes whereas the molten metal which is formed solidifies in the ingot mold to form a solid ingot.

In a known plant of the kind defined hereinbefore, six cylindrical fusible electrodes are regularly spaced apart on a circle in a top plan view. Three fusible electrodes form a set and are connected to the three phase conductors of a polyphase a.c. supply system. Three further electrodes are disposed between the fusible electrodes of the first set and form another set and are connected to the corresponding phase conductors of the polyphase a.c. supply system in the reverse order as regards the peripheral direction of said circle. For this reason, the rotating fields generated by these two sets of electrodes have opposite senses of rotation and a resulting rotating field, which would be detrimental in numerous cases, is not established. On the other hand, there is a relatively large region between the fusible electrodes in which no metal is melted. This results in the disadvantages that the ingot which is formed has strong inhomogeneities and can grow only at a relatively low rate during the remelting operation.

It is an object of the invention to avoid the stated disadvantages and to provide for the electric slag refining of metals a plant which is supplied with polyphase a.c. and in which a rotating field is not established, in the first place, and the fusible electrodes may be approximately regularly distributed over the cross-section of the ingot mold, which cross-section may be, e.g., circular. In a plant of the kind defined first hereinbefore, this is accomplished according to the invention in that in a top plan view two fusible electrodes are disposed on a first axis, the fusible electrodes of one additional pair or of each of a plurality of additional pairs are disposed on an axis which is normal to said axis, and the fusible electrodes are connected to the main conductors of the polyphase a.c. supply system in an arrangement which is symmetric with respect to the electrodes disposed on said first axis. In this connection it is pointed out that said axes are imaginary geometric axes.

Figure 2:
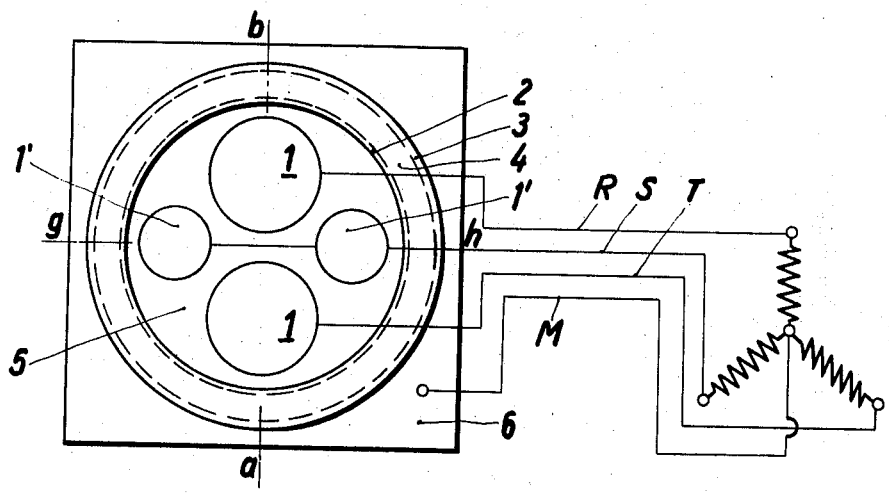

The invention will now be explained in detail with reference to two embodiments, which are shown diagrammatically and by way of example on the accompanying drawing, in which FIG. 1 is a top plan view showing a plant which serves for the electric slag refining of steels and comprises six fusible electrodes and FIG. 2 is also a top plan view showing a plant which serves the same purpose and comprises four fusible electrodes.

The following description is applicable to the plant shown in FIG. 1:

In a top plan view, five fusible electrodes 1 are regularly spaced on a circle which is concentric to a cylindrical ingot mold 2. The sixth fusible electrode 1 is disposed at the center of said circle. All fusible electrodes 1 have the same circular cross-section. One fusible electrode 1 disposed on said circle and the fusible electrode 1 at the center of said circle define a first axis $a-b$ and are connected to the same phase conductor S of the three-phase a.c. supply system used to fuse down the electrodes 1. This system may consist, e.g., of the secondary windings of a polyphase a.c. transformer. Each pair of fusible electrodes 1 which are disposed on the same axis $c-d$ or $e-f$, which is at right angles to the axis $a-b$, are connected to the same phase conductor R or T. The fusible electrodes 1 consist of steel and are immersed into a liquid slag layer 5 disposed in the ingot mold 2. The electrodes 1 are fused down under the action of the heat generated by the electric currents flowing through the electrodes. The resulting molten steel solidifies in the liquid-cooled ingot mold 2 to form a solid ingot. The neutral conductor M of the polyphase a.c. supply system is connected to a bottom plate 6, which consists preferably of copper and supports the ingot. The fusible electrodes 1 may be secured to one or more holders (not shown).

For the sake of completeness, the ingot mold 2 is cooled with water, which flows through a cavity 4 defined between the ingot mold 2 and an outer jacket 3.

The following description is applicable to the plant shown in FIG. 2.

Viewed in top plan, two fusible electrodes 1 define the first axis $a-b$ and are connected to different phase conductors R, T of the three-phase a.c, supply system which is used and is formed, e.g., by the secondary windings of a polyphase a.c. transformer. The two remaining fusible electrodes 1' are disposed on an axis $g-h$, which is normal to the axis $a-b$ and are connected to the third phase conductor S of the polyphase a.c. supply system. The circular cross-sectional area of each of the fusible electrodes 1' disposed on the second axis is smaller than and preferably one-half of the area of the also circular cross-section of each of the fusible electrodes 1 disposed on the first axis $a-b$. The two axes $a-b$ and $g-h$ just mentioned intersect the longitudinal axis of the cylindrical ingot mold 2.

In other respects, the remarks made hereinbefore in connection with the plant shown in FIG. 1 are also applicable to the plant shown in FIG. 2.

Although the invention is illustrated and described with reference to a plurality of preferred embodiments thereof, it is to be expressely understood that it is in no way limited to the disclosure of such a plurality of preferred embodiments, but is capable of numerous modifications within the scope of the appended claims.

What is claimed is:

1. A plant for the electric slag refining of metals, which comprises,
    an ingot mold adapted to hold a slag layer,
    a polyphase a.c. supply system having at least three phase conductors;
    at least two pairs of fusible electrodes extending into said ingot mold and adapted to extend into said slag layer, said fusible electrodes being arranged so that in a top plan view the electrodes of a first pair thereof are spaced apart on a first axis and the electrodes of each additional pair thereof are spaced apart on an additional axis, which is normal to said first axis,
    said first pair of electrodes being connected to a first phase conductor of said polyphase a.c. supply system,
    said additional pairs of electrodes being connected to additional phase conductors of said polyphase a.c. supply system, the connections to the additional phase conductors being electrically symmetrical relative to the connection to said first phase conductor, whereby said fusible electrodes are adapted to be fused down by heat generated as a result of an electric current flowing through said fusible electrodes so that molten metal is formed and is caused to solidify in said ingot mold to form a solid ingot when said mold is cooled with a liquid.

2. A plant as set forth in claim 1, in which said electrodes consist of steel.

3. A plant as set forth in claim 1, in which said polyphase a.c. supply system is a three-phase a.c. supply system and comprises three phase conductors.

4. A plant as set forth in claim 3, in which three pairs of said fusible electrodes are provided, five of said fusible electrodes are spaced apart in a top plan view on the circumference of a circle, a sixth of said fusible electrodes is disposed at the center of said circle and together with one of said five fusible electrodes forms said first pair of electrodes, the electrodes of each of the remaining pairs thereof are disposed on an axis which is normal to said first axis, and each of said phase conductors is connected to the electrodes of one of said pairs.

5. A plant as set forth in claim 3, in which two pairs of said fusible electrodes are provided, the electrodes of said first pair are connected to respective ones of said phase conductors, and the electrodes of the other pair are connected to the remaining one of said phase conductors.

6. A plant as set forth in claim 5, in which each of said electrodes of said other pair is smaller in cross-sectional area than each of the electrodes of said first pair.

7. A plant as set forth in claim 5, in which each of said electrodes of said other pair has a cross-sectional area which is approximately one-half the cross-sectional area of each of the electrodes of said first pair.

* * * * *